United States Patent [19]

Laughner et al.

[11] Patent Number: 5,306,771
[45] Date of Patent: Apr. 26, 1994

[54] HIGH RUBBER GRAFT THERMOPLASTIC COMPOSITION WITH IMPROVED MECHANICAL PROPERTIES PREPARED BY MELT BLENDING

[75] Inventors: Michael P. Laughner, Clifton Park; Marinus E. J. Dekkers, Schenectady; James J. Scobbo, Jr., Clifton Park; Robert J. Halley, Schenectady, all of N.Y.; Ronald L. Jalbert, Parkersburg, W. Va.

[73] Assignee: General Electric Company, Schenectady, N.Y.

[21] Appl. No.: 8,042

[22] Filed: Jan. 22, 1993

Related U.S. Application Data

[63] Continuation of Ser. No. 722,420, Jun. 27, 1991, abandoned.

[51] Int. Cl.$^5$ .............. C08G 63/91; C08L 37/00
[52] U.S. Cl. .................... 525/74; 428/35.7; 525/207; 525/208; 525/221
[58] Field of Search ............ 525/74, 207, 208, 221; 428/35.7

[56] References Cited

U.S. PATENT DOCUMENTS 5,047,475 9/1991 Ogawa et al. .............. 525/73

Primary Examiner—John C. Bleutge
Assistant Examiner—D. Aylward
Attorney, Agent, or Firm—William H. Pittman

[57] ABSTRACT

High rubber graft thermoplastic compositions are prepared by melt blending an EPDM or an EP rubber and a copolymer derived from a vinyl cyanide compound and a vinyl aromatic compound. Both the copolymer and the rubber are independently either epoxy or carboxy functionalized.

18 Claims, No Drawings

HIGH RUBBER GRAFT THERMOPLASTIC COMPOSITION WITH IMPROVED MECHANICAL PROPERTIES PREPARED BY MELT BLENDING

This application is a Continuation of application Ser. No. 07/722,420, filed Jun. 27, 1991, now abandoned.

This invention relates to high rubber graft thermoplastic resins possessing excellent weather and impact resistance as well as a process for their production; and more particularly it relates to blends of a copolymer derived from an aromatic vinyl compound and a vinyl cyanide compound and either an ethylene propylene type rubber (EPR) or an ethylene propylene diene monomer (EPDM) rubber.

Styrene-acrylonitrile-EPR or -EPDM (i.e. AES) resins are known in the art. Compared to the ABS resin (an aromatic vinyl compound-vinyl cyanide compound copolymer modified with an unsaturated rubberlike polymer such as polybutadiene), an AES resin (formed by substituting an EPDM for the unsaturated polymer in the ABS resin) exhibits improved weather resistance while retaining the excellent mechanical properties of the ABS resin.

AES resins are presently produced by either emulsion, bulk, or solvent based polymerization systems. However, emulsion polymerization is not optimally desired because EPDM in the latex form is difficult to obtain and is costly.

Batchwise solution polymerization techniques for producing AES resins pose difficulty in both feeding to the polymerizer and in handling the discharge therefrom, due to the high viscosity of the starting reactant solution and the even higher viscosity of the reacted composition. Moreover, the temperature control during the polymerization becomes complicated, thereby causing unsteadiness in the product quality from batch to batch. Therefore, this batchwise polymerization process is not optimal for commercial scale production.

Continuous solution polymerization techniques for producing AES resins have presented the following problems. The grafting degree of one EPDM (i.e. rubber particle) molecule may vary from that of another EPDM molecule, thus creating the possibility that while the average degree of grafting has reached the desired level, a portion of the resin may have an insufficient degree of grafting. Furthermore, as compared to the ABS resin employing an unsaturated rubber substrate, the AES resin utilizes EPDM which is inferior in compatibility with the resin phase. Therefore, a process that efficiently polymerizes AES resins that have excellent mechanical properties such as impact strength is desired.

Thus, the present invention provides a melt production process which produces an AES resin with good dispersion of the EPDM particle in a compatibilized styrene acrylonitrile phase; thereby providing an AES blend which exhibits excellent mechanical properties such as improved impact strength.

The present invention provides a high rubber graft composition comprising a. from about 10 weight percent to about 90 weight percent of ethylene propylene type rubber based on the total weight of the composition;

b. from about 90 weight percent to about 10 weight percent of copolymer chemically bonded to the rubber based on the total weight of the composition; the copolymer being derived from a composition comprising a vinyl aromatic compound and a vinyl cyanide compound;

c. about 0 to about 75 parts of an unfunctionalized copolymer derived from an aromatic vinyl compound and a vinyl cyanide compound (hereinafter unfunctionalized copolymer).

In one of its aspects, the present invention is provided by melt blending a copolymer (hereinafter copolymer), generated in-situ from an aromatic vinyl compound and a vinyl cyanide compound, and a rubber containing a copolymer derived from components comprising ethylene and $C_{3-10}$ mono-olefin, preferably EP or EPD rubber. Both the copolymer and the rubber independently contain either an epoxy or a carboxy functionality. The functionality of the rubber must react with the functionality on the copolymer. For example, the rubber may contain a carboxy functionality when the copolymer contains an epoxy functionality or the copolymer may contain the carboxy functionality when the rubber contains the epoxy functionality. The resultant composition is a weatherable analogue of an ABS resin with improved mechanical properties such as impact strength that are believed to be the result of a finer morphology in a compatibilized styrene-acrylonitrile continuous phase. This analogue preferably comprises about 8% to about 30% rubber. It is further believed that the reaction between the epoxy group and a carboxylic acid group or a functional derivative thereof, such as maleic anhydride is necessary to produce a copolymer which produces the fine dispersion of the EP of EPDM rubber in the styrene-acrylonitrile (SAN) continuous phase, thus producing an AES resin having the above mentioned improved mechanical properties and impact strength.

The above mentioned melt blending operation may be performed in conventional melt blending apparatus of both the batch and continuous type. It is often preferably conducted continuously in an extruder, by reason of the excellent properties of extruded material and the availability of extruders in commercial polymer processing facilities. Typical conditions include temperatures in the range of about 150°-300° C. The proportion of copolymer to rubber is about 90/10-10/90, and most often about 50/50. Optionally, the copolymer and the rubber may be first extruded to achieve a high graft rubber concentrate followed by a second extrusion with a functionalized copolymer derived from about 0 to about 75 parts of an unfunctionalized copolymer derived from an aromatic vinyl compound and a vinyl cyanide compound. The copolymer and the rubber may also be diluted with the unfunctionalized copolymer during the reactive extrusion step.

The aromatic vinyl compounds used in this invention include, for example, styrene and its analogues such as alpha-methylstyrene, halogenated styrenes, paradimethylstyrene, tert-butylstyrene and the like.

The vinyl cyanide compounds for use in this process include acrylonitrile and its homologs such as methacrylonitrile. A portion of the monomers can be replaced by other vinyl monomers such as methacrylates and acrylates, e.g. methyl methacrylate, methyl acrylate and the like, acrylic acid, methacrylic acid, acrylamide, methacrylamide, vinyl halides, vinyl ethers, maleic anhydride, and other copolymerizable vinyl compounds including maleimide or N-alkyl or N-aryl or substituted maleimides. The amount of the other vinyl monomers used may be preferably up to about 20% by weight based on the total weight of the monomers. The preferable monomer combination is a combination of styrene with acrylonitrile in a weight ratio of 90–60:10–40.

The styrene-acrylonitrile copolymer may be functionalized with an epoxy compound, such as glycidyl methacrylate. Suitable unsaturated epoxy compounds are glycidyl ethers of unsaturated alcohols, e.g., allyl glycidyl ether, methallyl glycidyl ether; glycidyl ethers of alkenylphenols, e.g., isopropenylphenyl glycidyl ethers; vinyl and allyl esters of epoxy carboxylic acids, vinyl esters of epoxidized oleic acid; and the like. A preferable subgenus includes unsaturated epoxy compounds of the formula

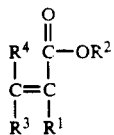

wherein $R^2$ is an organic group having an epoxide functionality, $R^1$ is a monovalent radical selected from the class consisting of hydrogen, $C_{(1-8)}$ alkyl, a $C_{(6-13)}$ aromatic organic group, aralkyl, alicyclic, and mixtures thereof, and $R^3$ and $R^4$ are preferably hydrogen but either may be a monovalent radical selected from the group consisting of $C_{(1-3)}$, $C_{(6-13)}$ aromatic organic group, aralkyl, alicyclic and mixtures thereof. Such epoxy compounds include glycidyl esters of unsaturated carboxylic acids; e.g., glycidyl 2-ethyl acrylate, glycidyl 2-propyl acrylate, glycidyl acrylate. Preferred as the graft monomer herein is glycidyl methacrylate (GMA). The styrene-acrylonitrile copolymer may also be functionalized by a carboxy compound, further described hereinbelow, such as maleic anhydride, fumaric acid, or itaconic acid.

EPDM rubbers which can be used in the practice of the present invention can be made by a well known procedure, as fully described in patents such as, U.S. Pat. Nos. 2,933,480, 3,093,621, 3,211,709, 3,646,168, 3,790,519, 3,884,993, 3,894,999 and 4,059,654 which are incorporated herein by reference. Suitable EPDM or EP rubber particles have a particle size of between 1 and 60 microns. A typical procedure for making olefinic impact modifiers such as EPDM is by reacting varying amounts of ethylene, $C_{3-10}$ mono-olefin, and a nonconjugated polyene monomer containing a plurality of carbon to carbon double bonds which is carried out in the presence of a catalyst and a solvent medium. Suitable polyene monomers include such polyene monomers as, open chained polyunsaturated hydrocarbons containing 4–20 carbon atoms, such as 1,4-hexadiene, monocyclic polyenes and polycyclic polyenes. The polyunsaturated bridged ring hydrocarbons or halogenated bridged ring hydrocarbons are preferred. Examples of such bridged ring hydrocarbons include the polyunsaturated derivatives of bicyclo(2,2,1) heptane, wherein at least one double bond is present in one of the bridged rings, such as dicyclopentadiene, bicyclo(2,2,1)hepta-2,5-diene, the alkylidene norbornenes, and especially the 5-alkylidene-2-norbornenes wherein the alkylidene group contains 1–20 carbon atoms and preferably 1–8 carbon atoms, the alkenyl norbornenes, and especially the 5-alkylidene-2-norbornenes, wherein the alkylidene group contains 3–20 carbon atoms and preferably 3–10 carbon atoms. Other bridged ring hydrocarbons include polyunsaturated derivatives of bicyclo(2,2,2)octane as represented by bicyclo(3,2,1) octane polyunsaturated derivatives of bicyclo(3,3,1 nonane and polyunsaturated derivatives of bicyclo(3,2,2)nonane.

Specific examples of preferred bridged ring compounds include 5-methyldene-2-norbornene, 5-ethylidene-2-norbornene, 5-n-propylidene-2-norbornene, 5-isobutylidene-2-norbornene, 5-n-butylidene-2-norbornene, 5-isobutylidene-2-norbornene, dicyclopentadines, the methyl butenyl norbornenes such as 5-(2-methyl-2-butenyl)-2-norbornene or 5-(3-methyl-2-butenyl)-norbornene, and 5-(3-dimethyl-4-hexenyl)-2-norbornene is preferred.

The EPDM backbone rubber may contain chemically bound molar ratios of ethylene to propylene or other

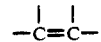

mono-olefins, varying between 95 to 5, and 5 to 95 ethylene to propylene, and preferably between 70 to 30 and 55 to 45 ethylene to propylene. The polyene or substituted polyene may be chemically bound therein in an amount of zero to 10 mol percent, and preferably 0.3 to 7 mol percent. The level of unsaturation in the backbone rubber may range from 0–20 double bonds, per 1,000 carbon atoms in the polymer chain.

The polymerization reaction for preparation of the EPDM is carried out in the presence of a catalyst in a solvent medium. The polymerization solvent may be any suitable inert organic solvent that is liquid under reaction conditions. Examples of satisfactory hydrocarbon solvents are straight-chain paraffins having from 5–8 carbon atoms with best results often being secured by the use of hexane, aromatic hydrocarbons and preferably an aromatic hydrocarbon having a single benzene nucleus, such as benzene, toluene and the like and saturated cyclic hydrocarbons having boiling point ranges approximately those of the straight chain paraffin hydrocarbons and aromatic hydrocarbons described above and preferably saturated cyclic hydrocarbons having 5–6 carbons atoms in the ring nucleus. The solvent selected can be a mixture of one or more of the foregoing hydrocarbons and preferably a mixture of aliphatic and naphthenic hydrocarbons having approximately the same boiling range as normal hexane. It is desirable that the solvent be dry and free of substances that will interfere with the Ziegler-type catalyst used in the polymerization reaction.

The interpolymerization is carried out in the presence of a Ziegler catalyst of the type well known to the prior art. Such Ziegler-type catalysts are disclosed in a large number of patents, such as U.S. Pat. Nos. 2,933,480, No. 3,093,620, No. 3,093,621, No. 3,211,709 and No. 3,113,115. Examples of Ziegler catalysts include metal organic coordination catalysts prepared by contacting a compound of heavy metal of the group IV-a, V-a, VI-a and VII-a of the Mendeleev periodic system of elements, such as titanium, vanadium and chromium halides with an organometallic compound of a metal of groups I, II or II of the Mendeleev periodic system which contains at least one carbon-metal bond, such as trialkyl aluminum and alkyl aluminum halides in which the alkyl groups contain from about 1 to about 20 and preferably 1–4 carbon atoms.

The preferred Ziegler catalyst is prepared from a vanadium compound and an alkyl aluminum halide.

Examples of suitable vanadium compounds include vanadium trichloride, vanadium tetrachloride, vanadium oxychloride, vanadium acetyl acetonate, etc. Activators which are especially preferred include alkyl aluminum chlorides of U.S. Pat. No. 3,113,115, having the general formula R-AlCl and R$_2$AlCl and the corresponding sesquichlorides of the general formula R$_3$Al$_2$Cl$_3$ in which R is methyl, ethyl, propyl, butyl or isobutyl in the catalyst system, the aluminum to vanadium mol ratio of the aluminum and vanadium compounds may be within the range of 5:1 to 200:1 and preferably within the range of 15:1 to 60:1 with best results being secured in the ratio of 40 aluminum to 1 vanadium. These same ratios apply with respect to corresponding compounds of others of the heavy metals substituted for the vanadium compound and the organometallic compounds of groups I, II and III for the aluminum compounds. A catalyst prepared from alkyl aluminum sesquichloride, such as the methyl or ethyl aluminum sesquichloride and vanadium oxychloride is preferred in the ratio of 1 mole vanadium oxychloride, per 5 to 300 moles of aluminum and more preferably 15 to 60 moles of aluminum with 40 moles of aluminum per mole of vanadium yielding the best results.

The polymerization is preferably carried out on a continuous basis in a reaction vessel closed to the outside atmosphere which is provided with an agitator cooling means and conduit means for continuously supplying the ingredients of the reaction including monomer catalyst and accelerators and conduit means of continuously withdrawing solution containing elastomer, and the catalyst is killed by the addition of a catalyst deactivator.

For the purpose of this invention, it is essential that the EPDM particle be functionalized with a group capable of reaction with the GMA groups on the SAN. Those skilled in the art will be familiar with suitable functional groups; examples are carboxylic acid groups and anhydrides and acidic esters thereof, sulfonic acid groups and amine groups. The carboxylic acid-derived groups are preferred by reason of their availability and the high stability of copolymers prepared therefrom.

The substituents may be incorporated in the polyolefin by employing suitable functional comonomers, such as acrylic acid, maleic anhydride, fumaric acid, itaconic acid, or allylamine, in the formation thereof. They may also be provided by graft polymerization on an already prepared EPDM, using the same monomers, or by other art-recognized means of functionalization. The EPDM is preferably functionalized with about 0.1 to about 20 weight percent carboxy monomer such as maleic anhydride.

The EPDM rubbers may also be functionalized with about 0.1 to about 20 weight percent with an epoxy compound mentioned herein above, preferably glycidyl methacrylate.

Modification of the EPDM rubber with the epoxy functional monomer is preferably achieved by premixing the epoxy monomer with a free radical initiator and thereafter blending the resulting mixture with the EPDM rubber. The resulting blend can be extruded at a temperature of about 100° C. to about 350° C. In the grafting reaction, there can be used 0.1 to 20 parts of the epoxy compound, preferably 2 to 10 per 100 parts by weight of the EPDM rubber.

If desired, the grafting reaction also can be carried out in a solvent solution with the unsaturated EPDM rubber present at a concentration which can range from about 10 to 30% by weight. Suitable organic solvents are for example, C$_{(5-10)}$ aliphatic hydrocarbons, such as hexane, heptane, octane, nonane and decane.

The reaction can be conducted with constant stirring at an elevated temperature within the range of 125°–200° C., and the time ranging from ½ to 2 hours. Preferably, the functionalization of the EPDM with the epoxy compound is achieved under melt conditions in the presence of a radical initiator such as, 2,5-dimethyl-2,5-bis(t-butylperoxy)hexane.

The composition of the present invention may optionally comprise up to about 40 percent by weight of filler material. Suitable filler material includes flame retardants, particulates or fibrous reinforcing agents, preferably glass fibers.

In order that those skilled in the art may be better able to practice the present invention, the following examples are given as illustrations of the preparation of the functionalized styrene/acrylonitrile—functionalized EPDM melt processed blends and copolymers of the present invention. It should be noted that the invention is not limited to the specific details embodied in the examples.

EXAMPLE 1

This example employs a melt polymerization process to prepare the AES polymer. EPDM rubber, commercially available from Copolyer Rubber and Chemical Corp. as Epsyn 801, was functionalized with maleic anhydride by charging EPDM (1000 parts) along with maleic anhydride (20 parts) and dicumyl peroxide (1 part) in the extruder at 400° F. The EPDM, maleic anhydride, and dicumyl peroxide (radical initiator) were mixed by tumbling prior to the extrusion. The extruded strand was pelletized and dried (80° C., 4 hrs.) before using in subsequent extrusions.

Styrene acrylonitrile copolymer was prepared and functionalized with about 3.0 weight % glycidyl methacrylate (GMA) as follows.

A 5 liter, 3 necked round bottom flask was equipped with an overhead stirring apparatus, condenser, gas flow, and thermometer. The following monomers and initiator were added to the flask:

1000 ml methyl ethyl ketone (MEK)
800 ml styrene
300 ml acrylonitrile
30 gm glycidyl methacrylate
2.5 gm azobis(isobutyronitrile) (AIBN) which was purified by recrystallization from methanol The solution was degassed by purging with N$_2$ for one hour. The solution was then heated at 70° C. for 15 hours while continuously being stirred. An additional 1000 ml of MEK and 1.0 gm AIBN were added to the flask and the resulting solution was heated to 75° C. for 4 more hours with continuous stirring.

The solution of polymer was divided into three batches. Each batch was poured into approximately 3.5 liters of rapidly stirring methanol. The polymer was collected and slurried twice in methanol. The large agglomerates of polymer were crushed mechanically, either by hand or by the high shear encountered during the slurrying process. The three batches were then combined and reslurried once again in methanol. The polymer was collected after each slurry by vacuum filtration. The combined polymer was air dried for approximately 1 hour then further dried in a vacuum oven at 60° C. for 48 hours.

This functionalized styrene acrylonitrile (FSAN) has approximately the same styrene to acrylonitrile ratios as the SAN 575 used in the control blends. The SAN 575 used was commercially available from General Electric Co.

The high rubber AES blend was then made by mixing 50 parts of the functionalized styrene acrylonitrile copolymer with 50 parts of the maleic anhydride (MAH) functionalized EPDM, a masterbatch or rubber concentrate, and extruding at 425° F. This blend was pelletized then dried at 80° C. for 4 hrs. The high rubber AES (50 parts) was diluted with non-functionalized SAN 575 (50 parts) and extruded at 425° F. to give the final AES blend with rubber content of about 25%. The blend was dried and injection molded into both large tensile and Izod bars. All of the extrusions were done on a Welding Engineers 20 mm twin screw extruder. Tensile testing was done on an Instron 1125 tensile testing machine using ASTM D638 type III specimens at a rate of 2.0"/min. The notched Izod tests were done on a TMI series 400 Izod impact tester with a two pound hammer according to ASTM D256.

The properties of the AES blends are listed in Table I below. Blend A is the non-functionalized system used as a control for comparison to blend B. Blend B is illustrative of the compatibilized AES resin with improved mechanical properties. Table I shows that functionalizing both the SAN with GMA and the EPDM with MAH leads to an improvement in properties due to copolymer formation. Copolymer is realized through the increase in insolubles in blend B above the expected 25% that would be accounted for by the EPDM. Also, a finer particle dispersion is noticed in scanning electron micrographs for the compatibilized AES (B) as compared to the uncompatibilized AES (A) blend. It is believed that the effects of the reduced particle size and compatibilization lead to the improvement of both the impact strength and strain to break.

TABLE I

| Blend composition in parts by weight | | |
| --- | --- | --- |
| | A | B |
| EPDM | 25 | — |
| SAN 575 | 75 | 50 |
| MAH functionalized EPDM | — | 25 |
| FSAN | — | 25 |
| Tensile Modulus (PSI × 10³) | 150 | 113 |
| Max Strain (%) | 4.5 | 19 |
| Notched Izod (ft-lbs/in) | 0.2 | 1.0 |
| % Insolubles (in Acetone, 72 hrs) | 26.8 | 44.7 |
| Particle Size (μm) | 10–60 | <10 |

EXAMPLE 2-7

A bulk polymerized sample of styrene acrylonitrile functionalized by 1 mole percent of glycidyl methacrylate (GMA-SAN) terpolymer prepared by thermal initiation at 110°–114° C. respectively without solvent or an initiator, was extruded with maleated EP rubber commercially available as Exxelor 1801 or 1803 from Exxon at rubber content of 25% and with various ratios of the styrene unfunctionalized acrylonitrile as shown in Table 2.

TABLE 2

| Examples | 2 | 3 | 4 | 5 | 6 | 7 |
| --- | --- | --- | --- | --- | --- | --- |
| Resin 575 SAN | 75 | 45.0 | 37.5 | 30.0 | 18.75 | 0.0 |
| SP097 (GMA-1) | — | 30.0 | 37.5 | 45.0 | 56.25 | 75.0 |
| Exxelor 1801 | 25 | 25 | 25 | 25 | 25 | 25 |
| Properties | | | | | | |
| ⅛" Izod (RT) | 0.6 | 1.0 | 1.1 | 1.1 | 1.3 | 1.2 |
| Tensile St., psi | 6432 | 6723 | 6673 | 6637 | 6549 | 6487 |
| Modulus, kpsi | 3.53 | 3.49 | 3.32 | 3.34 | 3.28 | 3.12 |
| Elongation % | 5.9 | 11.6 | 12.7 | 8.5 | 14.9 | 11.2 |
| Monsanto Melt Flow @ 450° F. | | | | | | |
| Visc @ 100 1/sec | 7262 | 10397 | 10190 | 10625 | 11064 | 10921 |
| Visc @ 500 1/sec | 2592 | 3773 | 3877 | 3894 | 4096 | 4001 |
| Visc @ 1000 1/sec | 1663 | 2438 | 2557 | 2527 | 2670 | 2596 |

Obviously, other modification and variations of the present invention are possible in light of the above teachings. It is therefore to be understood that changes may be made in particular embodiments of the invention described which are within the full intended scope of the invention as defined by the claims. It is to be further understood that all patents mentioned above are to be incorporated herein by reference as well as that all parts are by weight.

What is claimed is:

1. A composition obtained by blending, under reactive conditions, a mixture consisting essentially of:
   a. about 10 to about 90 parts of a rubber consisting essentially of ethylene, $C_{3-10}$ mono-olefin and epoxy- or carboxy-containing structural units and, optionally, nonconjugated diene-derived units;
   b. about 90 to about 10 parts of a carboxy or epoxy functionalized copolymer derived from an aromatic vinyl compound and a vinyl cyanide compound, said copolymer being carboxy functionalized when component a is epoxy functionalized and epoxy functionalized when component a is carboxy functionalized; and
   c. about 0 to about 75 parts of an unfunctionalized copolymer derived from an aromatic vinyl compound and a vinyl cyanide compound.

2. A composition according to claim 1 wherein the rubber is carboxy functionalized and component b is epoxy functionalized.

3. A composition according to claim 1 wherein the rubber is epoxy functionalized and component b is carboxy functionalized.

4. A composition according to claim 2 wherein the epoxy functionalized copolymer is derived from styrene, acrylonitrile, and glycidyl methacrylate.

5. A composition according to claim 4 wherein the rubber is selected from the group consisting of ethylene $C_{3-10}$ mono-olefin copolymer and ethylene, $C_{3-10}$ mono-olefin, nonconjugated diene terpolymer.

6. A composition according to claim 5 wherein the rubber is functionalized with about 0.1 to about 20 percent by weight of carboxy containing grafting material.

7. A composition according to claim 6 wherein the rubber is the reaction product of ethylene-propylene-nonconjugated diene terpolymer, a peroxide, and maleic anhydride.

8. A composition according to claim 6 wherein component b is a styrene-acrylonitrile-glycidyl methacrylate copolymer.

9. A composition according to claim 2 wherein the rubber contains sufficient carboxy functionality to enhance the impact strength of the composition.

10. A composition according to claim 2 wherein the copolymer contains sufficient epoxy functionality to enhance the impact strength of the composition.

11. A composition according to claim 3 wherein the rubber is selected from the group consisting of ethylene, $C_{3-10}$ mono-olefin rubber and an ethylene, $C_{3-10}$ mono-olefin, nonconjugated diene terpolymer 12. A composition according to claim 3 wherein the rubber has a number average particle size of between 1 and 60 microns and the rubber content is between about 8 about 35 percent.

13. A composition according to claim 12 wherein the rubber is functionalized with about 0.1 to about 20 percent by weight of epoxy containing grafting material.

14. A composition according to claim 1 wherein the rubber is the reaction product of ethylene $C_{3-10}$ mono-olefin nonconjugated diene terpolymer, a peroxide and maleic anhydride.

15. A composition according to claim 1 further comprising up to about 40 weight percent by weight of filler material.

16. A composition according to claim 15 wherein the filler material comprises particulate or fibrous reinforcing agents.

17. A molded article comprising the composition of claim 1.

18. An extruded article comprising the composition of claim 1.

* * * * *